Dec. 9, 1930.　　　　F. W. HILD　　　　1,784,593

GEAR TRANSMISSION

Filed Aug. 13, 1925

WITNESSES:
G. S. Neilson
M. B. Jaspert

INVENTOR
Frederic W. Hild

BY
Wesley G. Carr
ATTORNEY

Patented Dec. 9, 1930

1,784,593

UNITED STATES PATENT OFFICE

FREDERIC W. HILD, OF LOS ANGELES, CALIFORNIA

GEAR TRANSMISSION

Application filed August 13, 1925. Serial No. 49,901.

My invention relates to gear transmissions, more particularly to a transmission unit for use in the drive systems of oil-well drilling apparatus.

It is among the objects of my invention to provide a transmission unit for operatively connecting the driving and driven elements of a well-drilling device and which shall be of simple, compact and durable mechanical construction, which shall comprise a minimum number of parts and which shall be self-contained as a unit in a gear casing that may be readily transposed with respect to the well-drilling system.

Another object of my invention is to provide a gear transmission unit which shall be readily coupled to a prime mover, such as an electric motor or a steam or gas engine.

Another object of my invention is to provide a transmission unit, of the above-designated character, which shall be provided with means for engaging the drilling tool and the standard draw works, together with means for co-ordinating the functions of the drill and draw works, with the object of attaining the most efficient operating conditions.

In my copending application, Serial No. 614,941, filed Jan. 25, 1923, I have described a transmission unit for well drilling apparatus which embodies a differential gear mechanism for differentiating the speeds of its driving and driven elements, the invention pertaining to certain details of construction for adapting it to well-drilling equipment.

My present invention is an improvement on the transmission system therein described and comprises a much simplified arrangement of elements and of the housing member in which they are contained, thus facilitating its adaptation to the equipment with which it co-operates, which comprises chiefly a rotary drill table, a draw works including a hoist drum and a countershaft, and a prime mover, such as a reciprocating engine or a dynamo-electric machine.

Figure 1:
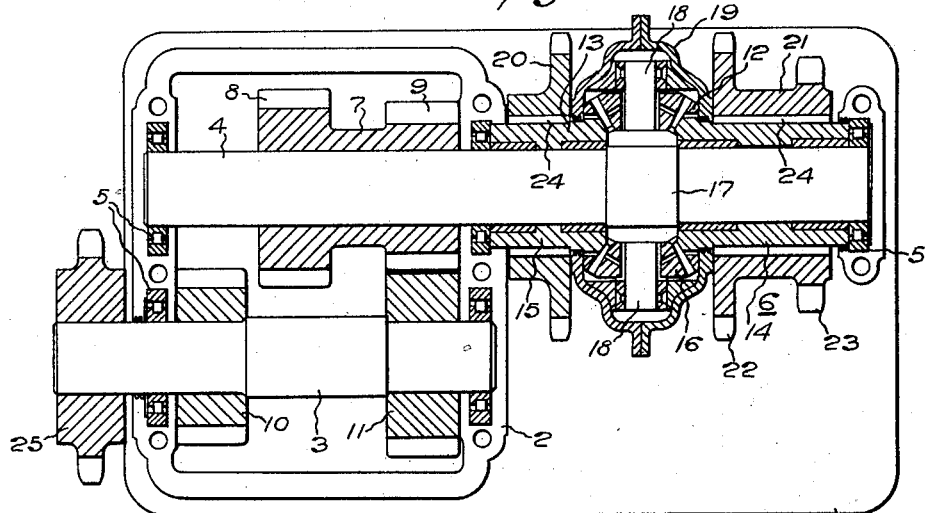
Figure 2:
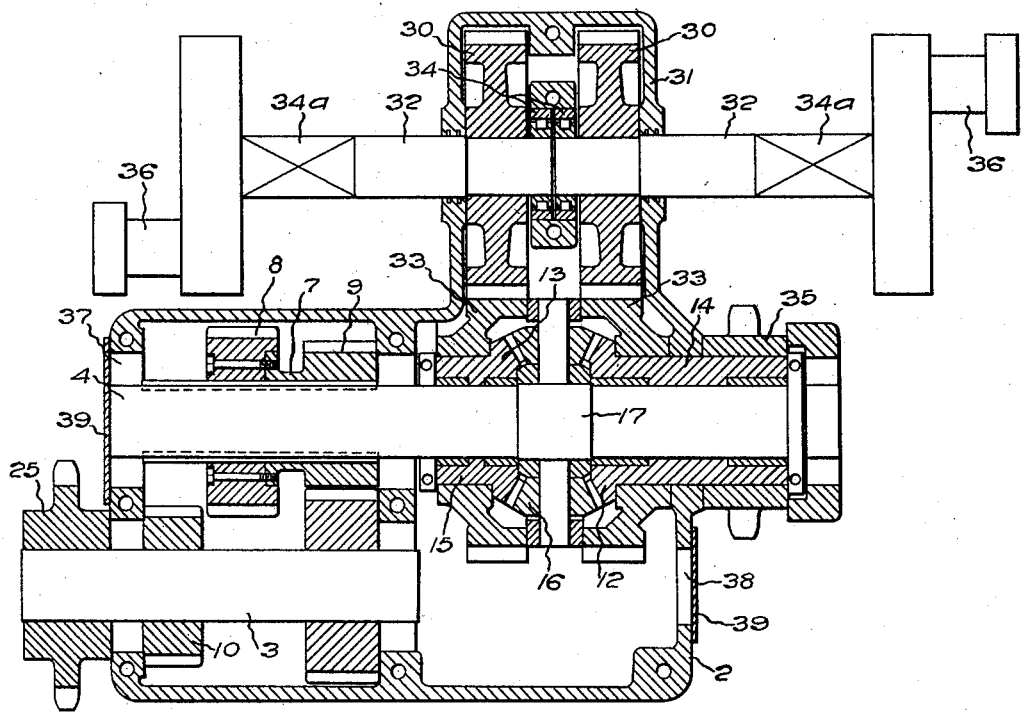

In the accompanying drawings, constituting a part hereof and in which like reference characters designate like parts, Figure 1 is a view, partially in elevation and partially in cross-section, of a gear transmission unit embodying the principles of my invention, and Fig. 2 is a similar view of a somewhat modified form of gear unit that is especially adapted to be associated with reciprocating engines.

The apparatus shown in Fig. 1 comprises a bed plate 1 having a casing 2 mounted thereon or formed integrally therewith, as the case may be, in which is mounted a plurality of shaft members 3 and 4 having their axes in parallel alinement. The shafts are journalled by roller bearings 5 in the casing member 2, the member 3 being a stub shaft, while member 4 has one end journalled in an extended portion 6 of the casing 2. Splined on the shaft member 4 is a slidable sleeve gear 7 having toothed peripheries 8 and 9 for engagement respectively with either gear wheel 10 or gear-wheel 11, which are mounted on the shaft member 3. A plurality of bevel gear-wheels 12 and 13, comprising the sun gear-wheels of a differential gear system, are rotatably journalled on the shaft 4 and are provided with extending sleeve portions 14 and 15. A plurality of planetary gear-wheels 16, which co-operate with the sun gear-wheels 12 and 13, are mounted on a spider 17, which is secured to the shaft 4 and adapted to rotate therewith. The radially-extending arms 18 of the spider member are secured to a split casing 19, which rotates with the planetary system.

A sprocket 20 is mounted on the sleeve portion 15 of the sun gear-wheel 13 and a multiple sprocket 21 is similarly mounted on the sleeve portion 14 of the sun gear 12. The multiple sprocket 21 comprises a plurality of sprocket wheels 22 and 23. The sprockets 20 and 21 are respectively secured to the sleeve portions 15 and 14 by keys 24. Another sprocket 25 is mounted on the end of the shaft 3 outside of the gear casing 2. The sleeve gear 7 is mounted on the shaft 4 in such manner as to be axially movable thereon, which movement may be effected by a shifting lever (not shown), which may be mounted on the casing in any suitable manner, the lever being engaged by a yoke connection on the illustrated restricted portion of the sleeve, in accordance with a familiar practice.

In the modification shown in Fig. 2, I have altered the shape of the housing member 2 to include the above-designated differential gear-wheels and also a pair of alined gear-wheels 30. The additional or extended portion 31 of the casing 2 contains centrally located bearings 34 that are adapted to journal a pair of alined crank shafts 32, on which the gear-wheels 30 are mounted for respective engagement with spur gear-wheels 33 that are mounted on the extending sleeve portions 14 and 15 of the sun gear-wheels 12 and 13, respectively. The crank shafts 32 are also journalled independently of the housing 2 in outer bearings 34a by means of pedestal bearing members (not shown), which may be secured to the base plate 1 in the usual manner.

Sprockets 25 and 35 are mounted on the shaft 3 and on the extension sleeve 14 of the sun gear-wheel 12, respectively, and the shafts 32 are provided at their outer ends with cranks 36 by which they may be connected to a pair of reciprocating engines (not shown). The planetary gear-wheels 16 are mounted on the spider portion 17, which is fastened to the shaft member 4 in the same manner as shown in Fig. 1. The sleeve gear 7 is provided with a spline connection with the shaft 4, by means of which it is axially movable thereon to effect engagement of the gear-wheels 8 and 10 or 9 and 11, respectively, to provide the desired speed reduction between the shafts 4 and 3.

The gear box 2, in Figs. 1 and 2, constitutes a lubricating chamber for the gear members and other rotating elements and openings 37 and 38 are provided for packing the box with suitable lubricant. Cover plates 39 are secured to the casing to close the openings and prevent access of grit and other foreign substances.

The operation of my device is briefly as follows: The transmission units may be connected to any prime mover and driven elements for which they are suitable, but they have been particularly designed for use in oil-well drilling equipment in the manner set forth in my copending application.

When used for this purpose, the sprockets 20 and 22, Fig. 1, are connected to a plurality of prime movers, such as reciprocating engines or dynamo-electric machines, and the sprocket 23, which is integrally associated with the sprocket 22, is connected to the rotary drill table, which rotates the drill stem. The sprocket 25 is operatively connected to the standard draw works, which comprises a countershaft having suitable connections to a hoist drum that regulates the longitudinal movement of the drill stem.

In operation, the transmission is effective for regulating the feed of the drill relative to its cutting speed, in accordance with the kind and hardness of earth formations encountered. That is, the draw works connected to the sprocket 25 will be responsive to the resistance encountered by the bit or drill by virtue of the differential connection of the shaft 3, on which the wheel 25 is mounted, to the rotary drill table. If the prime movers that are connected to the sprockets 20 and 22 are operated in opposite directions, then the revolution of the planetary gear-wheels 16 and the shaft 4, to which they are secured, will be in a direction corresponding to the direction of rotation of whichever sun-gear-wheel operates at the greater speed.

When there is a slowing down of one side of the differential mechanism, by reason of the load on the sprocket 23, resulting from the loading of the drill bit, the speed of the shaft 4 will decrease a like amount until, under very heavy load conditions, the speed of the rotary table falls below that of the speed of the sprocket 20. In this case the shaft 4 will reverse or operate in the opposite direction, thereby producing a retrieving action on the draw works to reverse the direction of feed of the drill stem.

This retrieval or withdrawal feature has been fully explained in the above-mentioned applications, but is more effectively produced by the transmission system herein described because of its simplicity of parts and operation.

In the modification shown in Fig. 2, the connections to the rotary table and draw works through the sprockets 35 (corresponding to sprocket 23) and 25 is the same as that described in connection with Fig. 1; and the only material difference lies in the means for connecting the transmission device to the prime movers, which is herein illustrated as being effected through the cranks 36, which are particularly adapted for use with reciprocating engines.

The device shown in Fig. 1 may be connected through sprocket chains to either reciprocating engines or dynamo-electric machines, as the case may be, and in either device, the speed of the shaft 3 may be regulated by engaging and disengaging the gear-wheels 8 and 10 or 9 and 11, respectively, which is accomplished by the shifting of the sleeve gear 7 in an axial direction on the shaft 4.

It is evident from the foregoing description of my invention that transmission systems made in accordance therewith provide simple and efficient means for transmitting power from a plurality of prime movers to the rotary drill table and draw works of oil-well equipment, although it is apparent that this device may be utilized for any purpose to which its characteristics and connecting elements are adapted.

Although I have described a specific embodiment of my invention, it will be obvious to those skilled in the art that modifications may be made in the details of construction and in the size and proportion of the several co-operating parts without departing from the principles herein set forth.

I claim as my invention:—

1. In a gear transmission, a pair of coaxially disposed crank shafts adapted to be operated by independent sources of power, pinions on the adjacent ends of said shafts, a shaft mounted parallel to said crank shafts, a differential mechanism mounted on said shaft, said differential mechanism comprising a spider secured to the shaft, planetary gears journalled on said spider, and sun gears journalled on said shaft in co-operative engagement with said planetary gears, said sun gears having gear wheels mounted thereon for co-operating with the pinions on said crank shafts, a driven element connected to one of said gear wheels, a shaft mounted parallel to said first named shaft, a second driven element connected to said parallel shaft, and a sliding gear mechanism for transmitting motion from said first named shaft to said second shaft at selective ratios for varying the proportion of power furnished by each source to exert a predetermined ratio of torque on the driven elements.

2. In a gear transmission, the combination, with a pair of coaxially disposed crank shafts and a plurality of shafts journalled with their axes in parallel alinement with the crank shafts, of a differential mechanism secured to one of the shafts, gear wheels for connecting each of the crank shafts to the differential mechanism, a driven element operatively connected to one crank-shaft, a variable-speed gear set for transmitting power from the differential member to another of the shafts and a second driven element on said shaft, said differential mechanism and variable-speed gear set being operative to regulate the relation between the ratio of power supplied by each crank shaft and the ratio of torque supplied to each driven element.

3. In a gear mechanism for transmitting power from a plurality of power sources to a plurality of driven elements, a plurality of shafts disposed in parallel alinement, a differential mechanism connecting some of said shafts, a variable-speed gear set for connecting other shafts to said first named shafts, means adapted to connect the differential mechanism to two sources of power and means adapted to connect the transmission to a plurality of driven elements, said differential mechanism and variable-speed gear set being disposed to vary the ratio of power supplied by the two sources of power and to regulate the distribution of power to the driven elements.

4. A transmission mechanism comprising a differential mechanism, driving means for transmitting power from two independent motive devices to the differential mechanism, two driven elements for cooperating with the differential mechanism, one of said driven elements being directly connected thereto, and a variable-speed gear unit for transmitting power from the differential mechanism to the other of said driven elements whereby the ratio of the torque exerted by the differential mechanism on the driven elements may be varied to alter the ratio of the power supplied by the two motive devices.

5. In a transmission mechanism, a differential device comprising three elements, two driving members connected to the first and second elements, respectively, of the differential device, and two driven members connected to the second and third elements, respectively, of the differential device, whereby the ratio of the torque exerted on the two driven members is proportional to the ratio of the power supplied by the two driving members, and a variable-speed gear set for regulating the proportion of the ratio of the torque exerted on the two driven members to the ratio of the power supplied by the two driving members.

6. In a gear mechanism for transmitting power from a plurality of power sources to a plurality of driven elements, a differential mechanism, driving elements adapted to connect the differential mechanism to two sources of power, a plurality of driven elements, a variable-speed gear mechanism for connecting the differential mechanism to one driven element, and means for connecting the differential mechanism to another driven element, said differential mechanism and variable-speed gear set being disposed to vary the ratio of power supplied by the driving elements and to regulate the distribution of torque to the driven elements.

7. In a transmission mechanism, a differential mechanism comprising three elements, two driving members adapted to connect two elements of the differential mechanism to two sources of power, two driven members, means for connecting one driven member to one of the elements of the differential mechanism which is connected to a driving member and a variable-speed gear mechanism for connecting the other driven member to the third element of the differential mechanism, whereby the proportion of the total power supplied by each driving member to maintain a predetermined ratio of the torque exerted upon the driven members may be varied.

In testimony whereof, I have hereunto subscribed my name this 31st day of July, 1925.

FREDERIC W. HILD.